US007160188B2

(12) United States Patent
Kaminkow et al.

(10) Patent No.: US 7,160,188 B2
(45) **Date of Patent: *Jan. 9, 2007**

(54) GAMING DEVICE HAVING A MULTIPLE SELECTION AND AWARD DISTRIBUTION BONUS SCHEME

(75) Inventors: Joseph E. Kaminkow, Reno, NV (US); Randall D. Mead, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 21 days.

This patent is subject to a terminal disclaimer.

(21) Appl. No.: 10/459,809

(22) Filed: Jun. 12, 2003

(65) Prior Publication Data

US 2003/0216163 A1 Nov. 20, 2003

Related U.S. Application Data

(63) Continuation of application No. 09/688,635, filed on Oct. 16, 2000, now Pat. No. 6,599,185.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/20; 463/16; 463/17; 463/22; 273/138.1

(58) Field of Classification Search .................... 463/1, 463/16–23, 25, 13; 273/138.1, 138.2, 139, 273/143 R, 279, 269; 700/91–93

See application file for complete search history.

(56) References Cited

U.S. PATENT DOCUMENTS

| | | | | |
|---|---|---|---|---|
| 1,527,929 A | | 2/1925 | Simons | |
| 4,560,161 A | | 12/1985 | Hamano | |
| 4,582,324 A | | 4/1986 | Koza et al. | |
| 4,695,053 A | | 9/1987 | Vazquez, Jr. et al. | |
| 5,456,465 A | | 10/1995 | Durham | |
| 5,542,669 A | | 8/1996 | Charron et al. | |
| 5,788,573 A | | 8/1998 | Baerlocher et al. | |
| 5,851,147 A | * | 12/1998 | Stupak et al. ................. | 463/13 |
| 5,882,259 A | | 3/1999 | Holmes, Jr. et al. | |
| 5,947,820 A | | 9/1999 | Morro et al. | |
| 6,015,346 A | | 1/2000 | Bennett | |
| 6,089,976 A | | 7/2000 | Schneider et al. | |

(Continued)

FOREIGN PATENT DOCUMENTS

EP 0122138 A2 * 10/1984

(Continued)

OTHER PUBLICATIONS

Richard M. Bueschel, Lemons, Cherries and Bell-Fruit-Gum, Royal Bell Books, Denver, CO, 1995, pp. 127-128.*

(Continued)

*Primary Examiner*—John M. Hotaling, II
*Assistant Examiner*—Aashish Karkhanis
(74) *Attorney, Agent, or Firm*—Bell, Boyd & Lloyd LLC

(57) ABSTRACT

A gaming device having a multiple selection and award distribution bonus scheme. A selection is chosen from a group of selections. The game determines awards for distribution to the selection. Once determined, the awards are distributed to the selection and a player is provided with the awards. The game preferably utilizes a number of award pools in order to determine the award distribution. This award pool determination is based on, for example, a number of probability tables associated with the award pools.

47 Claims, 11 Drawing Sheets

U.S. PATENT DOCUMENTS

| | | | | |
|---|---|---|---|---|
| 6,102,798 | A | 8/2000 | Bennett | |
| 6,126,542 | A | 10/2000 | Fier | |
| 6,142,874 | A | 11/2000 | Kodachi et al. | |
| 6,146,273 | A | 11/2000 | Olsen | |
| 6,159,096 | A | 12/2000 | Yoseloff | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,174,235 | B1 * | 1/2001 | Walker et al. | 463/25 |
| 6,364,766 | B1 * | 4/2002 | Anderson et al. | 463/16 |
| 6,398,218 | B1 | 6/2002 | Vancura | |
| 6,537,150 | B1 * | 3/2003 | Luciano et al. | 463/16 |
| 6,592,457 | B1 * | 7/2003 | Frohm et al. | 463/16 |
| 6,599,185 | B1 * | 7/2003 | Kaminkow et al. | 463/16 |

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0984409 | A2 | 3/2000 |
| WO | WO 00/12186 | | 3/2000 |

OTHER PUBLICATIONS

Winning Bid Brochure written by WMS Gaming, Inc., published prior to 2000.

Haywire Web Site Description written by IGT, published prior to 2000.

* cited by examiner

FIG.10A

| | FIRST AWARD POOL (166) | SECOND AWARD POOL (168) | THIRD AWARD POOL (170) |
|---|---|---|---|
| PREDETERMINED NUMBER OF AWARDS 172 | 172a 4 | 172b 4 | 172c 2 |
| ASSIGN AWARDS TO AWARD POOLS 174 | 174a DEAC | 174b IHFG | 174c BJ |
| NUMBER RANGE OF AWARDS FOR DISTRIBUTION 176 | 176a 2-4 | 176b 1-4 | 176c 0-2 |
| AWARD RANGE 178 | 178a 2-10 | 178b 12-25 | 178c 30-100 |
| DETERMINATION OF AWARDS FOR DISTRIBUTION 180 | 180a DE | 180b I | 180c B |
| AWARDS FOR DISTRIBUTION 182 | 182a 4 | 182b 20 | 182c 30 |

FIG.10B

FIRST AWARD POOL

| NUMBER OF AWARDS FOR DISTRIBUTION (184) | DISTRIBUTION PROBABILITY (186) |
|---|---|
| 2 184a | 40% 186a |
| 3 184b | 30% 186b |
| 4 184c | 30% 186c |

FIG.10C

SECOND AWARD POOL 188 190

| NUMBER OF AWARDS FOR DISTRIBUTION (188) | DISTRIBUTION PROBABILITY (190) |
|---|---|
| 1 (188a) | 20% (190a) |
| 2 (188b) | 50% (190b) |
| 3 (188c) | 20% (190c) |
| 4 (188d) | 10% (190d) |

FIG.10D

THIRD AWARD POOL 192 194

| NUMBER OF AWARDS FOR DISTRIBUTION (192) | DISTRIBUTION PROBABILITY (194) |
|---|---|
| 0 (192a) | 50% (194a) |
| 1 (192b) | 25% (194b) |
| 2 (192c) | 25% (194c) |

GAMING DEVICE HAVING A MULTIPLE SELECTION AND AWARD DISTRIBUTION BONUS SCHEME

PRIORITY CLAIM

This application is a continuation of and claims the benefit of U.S. patent application Ser. No. 09/688,635, now U.S. Pat. No. 6,599,185, filed Oct. 16, 2000, entitled, "GAMING DEVICE HAVING A MULTIPLE SELECTION AND AWARD DISTRIBUTION BONUS SCHEME".

CROSS-REFERENCE TO RELATED APPLICATIONS

This application is related to the following commonly-owned co-pending patent applications: "GAMING DEVICE HAVING SEPARATELY CHANGEABLE VALUE AND MODIFIER BONUS SCHEME," Ser. No. 09/626,045, now U.S. Pat. No. 6,569,015; "GAMING DEVICE HAVING A METHOD FOR RANDOMLY GENERATING A BONUS ROUND OUTCOME," Ser. No. 09/679,251, now U.S. Pat. No. 6,569,016; "GAMING DEVICE HAVING A BONUS ROUND WITH MULTIPLE RANDOM AWARD GENERATION AND MULTIPLE RETURN/RISK SCENARIOS," Ser. No. 09/678,989, now U.S. Pat. No. 6,776,711; "GAMING DEVICE HAVING AN INDICATOR SELECTION WITH PROBABILITY-BASED OUTCOME BONUS SCHEME," Ser. No. 09/605,809, now U.S. Pat. No. 6,315,664; "GAMING DEVICE HAVING AN INDICATOR SELECTION WITH PROBABILITY-BASED OUTCOME BONUS SCHEME," Ser. No. 09/981,163, now U.S. Pat. No. 6,783,457; "GAMING DEVICE HAVING A MULTIPLE SELECTION AND AWARD DISTRIBUTION BONUS SCHEME." Ser. No. 09/688,635, now U.S. Pat. No. 6,599,185; "GAMING DEVICE HAVING AN INDICATOR SELECTION WITH PROBABILITY-BASED OUTCOME," Ser. No. 09/990,693, now U.S. Pat. No. 6,676,516; "GAMING DEVICE HAVING A METHOD FOR RANDOMLY GENERATING A BONUS ROUND OUTCOME," Ser. No. 10/437,656, now U.S. Pat. No. 6,796,901; "GAMING DEVICE HAVING SEPARATELY CHANGEABLE VALUE AND MODIFIER BONUS SCHEME," Ser. No. 10/409,965, now U.S. Pat. No. 6,569,015; "GAMING DEVICE HAVING A MULTIPLE SELECTION AND AWARD DISTRIBUTION BONUS SCHEME," Ser. No. 10/452,304, "GAMING DEVICE HAVING SEPARATELY CHANGEABLE VALUE AND MODIFIER BONUS SCHEME." Ser. No. 10/767,484, "GAMING DEVICE HAVING AN INDICATOR SELECTION WITH PROBABILITY-BASED OUTCOME." Ser. No. 10/734,307, and "GAMING DEVICE HAVING A BONUS ROUND WITH MULTIPLE RANDOM AWARD GENERATION AND MULTIPLE RETURN/RISK SCENARIOS." Ser. No. 10/865,713.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device including a selection and multiple award distribution bonus scheme.

BACKGROUND OF THE INVENTION

Many existing gaming machines, such as, traditional slot machines, include bonus schemes. Typically, a bonus round of the bonus scheme begins when a player reaches a bonus triggering event in the primary game of the gaming device. In slot machines that employ reels, the triggering event generally occurs when the player reaches a predetermined combination of symbols on the reels. In general, the bonus round provides the player with an opportunity to gain and accumulate a bonus value, award or prize before the bonus round ends or terminates.

To increase player enjoyment and excitement, it is desirable to provide players with gaming devices having new bonus schemes.

SUMMARY OF THE INVENTION

The present invention provides a gaming device and method which includes a group of selections and a plurality of awards distributed to the selections. The player chooses or selects one of the selections and the game distributes the awards to all of the selections. The player receives the awards distributed to the player's selection. The game randomly determines which awards are distributed to the selections.

In one preferred embodiment, the present invention utilizes a number of award pools to randomly determine the awards distributed to the player. The award pools provide the player with a chance of receiving awards from each award pool ranging from a minimum number of awards in a pool to a maximum number of awards in a pool wherein the lowest award preferably includes an award associated with at least one of the distributed awards.

To further enhance player excitement and entertainment, the present invention provides a modifier associated with the player's selection. If the player receives an award which is associated with the modifier, the player's total award is modified (i.e., such as doubled). The modifier increases the player's award total based on any suitable modifying factor. The player receives the modifier if the award associated with the modifier is distributed to the player's selection.

Other objects, features and advantages of the invention will be apparent from the following detailed disclosure, taken in conjunction with the accompanying sheets of drawings, or in like numerals referred to like parts, elements, components, steps and processes.

BRIEF DESCRIPTION OF THE DRAWINGS

FIGS. 10A is a flow diagram illustrating a number of award pools utilized to determine the distribution of awards to the player selection as shown in FIG. 10; and FIGS. 10B to 10D are flow diagrams illustrating a probability table associated with the award pools of FIG. 10A.

DETAILED DESCRIPTION OF THE INVENTION

Gaming Device and Electronics

Figure 1A:
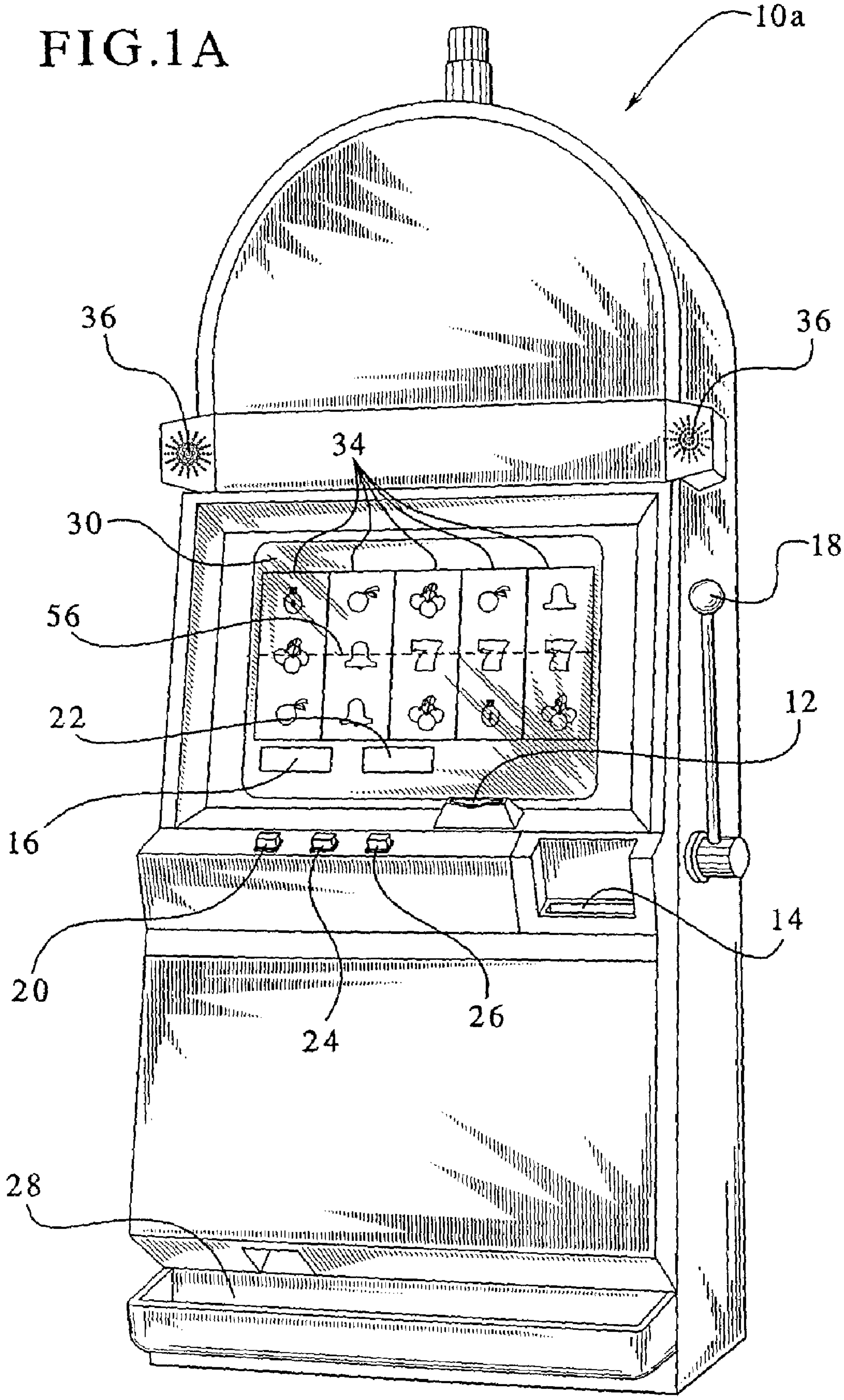
FIG. 1A is a perspective view of one embodiment of the gaming device of the present invention.
Figure 1B:
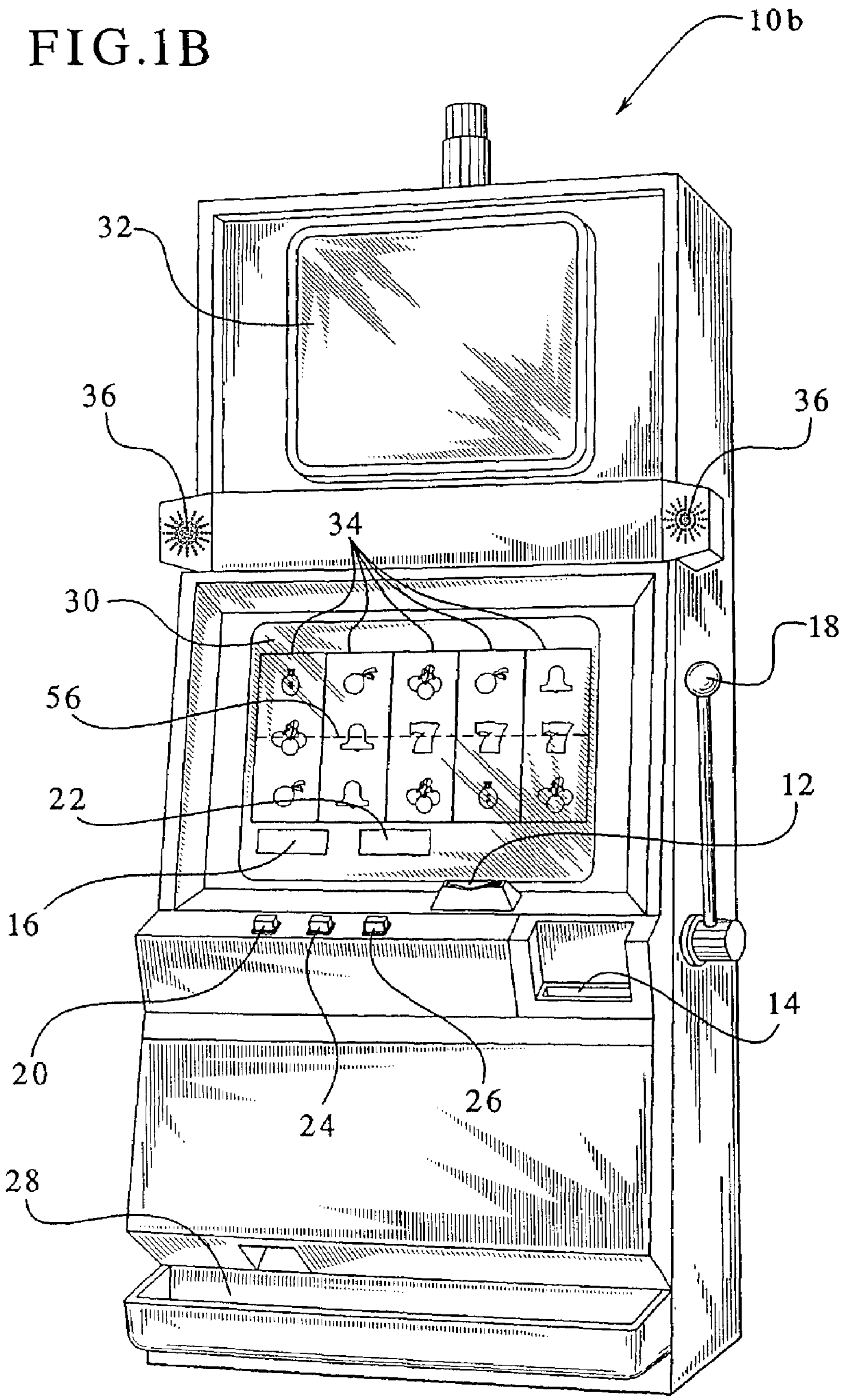
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sifting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
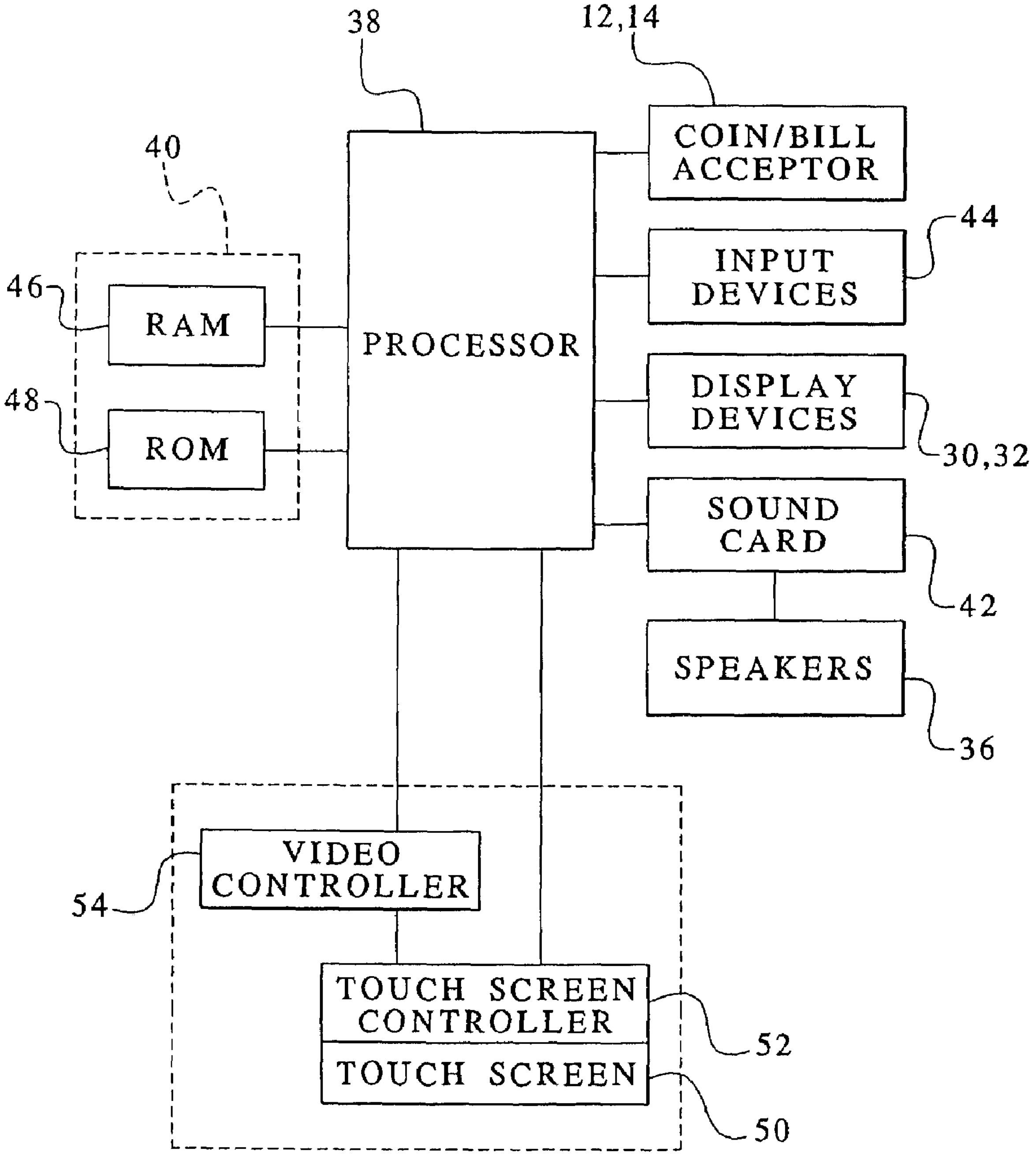
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

BONUS SCHEME

If a player achieves a bonus triggering or qualifying condition while playing the game, the gaming device 10 automatically begins the bonus round of the present invention. At the beginning of the bonus round, the game exhibits or displays one or more symbols, sounds, indicators, selections, visual or audio representations or other graphical representations. The bonus scheme may involve a variety of game scenarios which involve awarding bonus values to a player upon the occurrence of certain events. The computer of the gaming device determines what a game exhibits or displays, game scenarios, the object of the game, how the game is played and the various events which occur in the game.

Figure 3:
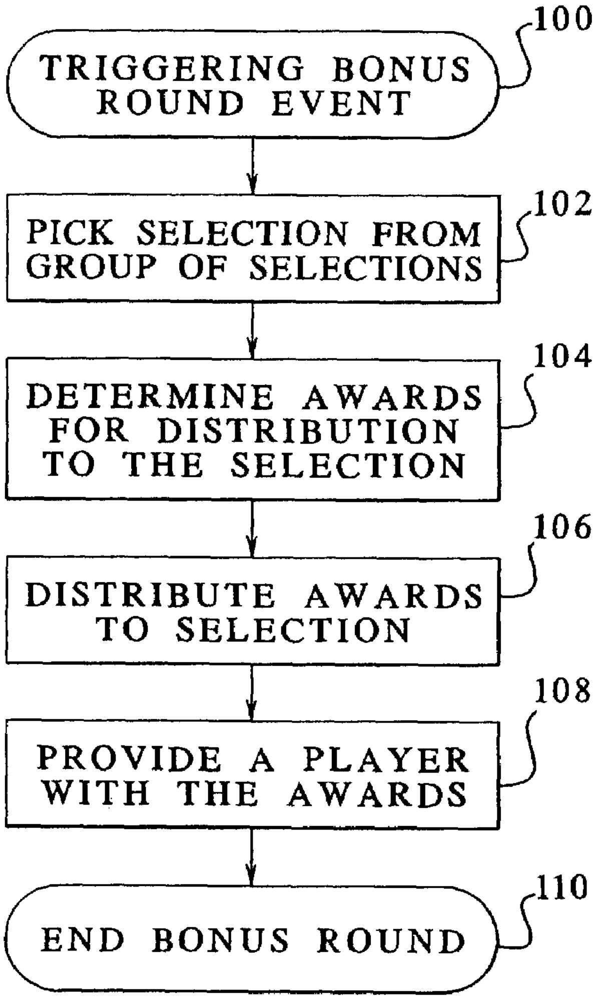
FIG. 3 is a flow diagram of one embodiment of the present invention.

As illustrated in FIG. 3, the bonus scheme begins by the triggering of a bonus round event as indicated by circle 100. For example, the bonus round triggering event includes a player who depresses a start button. However, the present invention is not limited to this type of bonus triggering event and can include a variety of known player and game activated triggering events.

The bonus round preferably proceeds with the player picking or choosing a selection in a group of selections or selection groups as indicated by block 102. However, the picking of the selection, preferably the player selection, can be conducted in a variety of known player and game activated ways. The game determines the awards, preferably in a group of awards (i.e., an award group), which are to be distributed to the player selection as indicated by blocks 104 and 106. The game provides a player with the awards as indicated by block 108. Thereafter, the bonus round ends as indicated by circle 110.

The present invention preferably utilizes a number of award pools for determining the awards for distribution to the player selection as illustrated in FIGS. 3A to 3D. The award pools preferably have a predetermined number of awards as indicated by block 112 and as further illustrated in FIGS. 3A to 3D. However, the awards pools are not limited to having the predetermined number of awards and thus can include any suitable number of awards.

The awards are assigned to the award pools based on the predetermined number of awards associated with the award pools as indicated by block 114 and as further illustrated in FIGS. 3A to 3D.

Figure 3A:
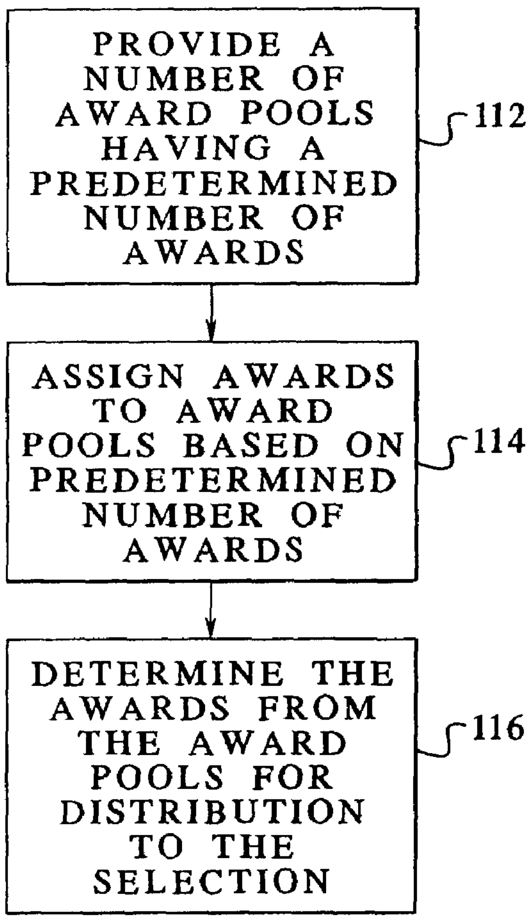
FIGS. 3A to 3D are flow diagrams of the determination step of FIG. 3 utilizing a number of award pools and illustrating various steps for determining the distributed awards.
Figure 3B:
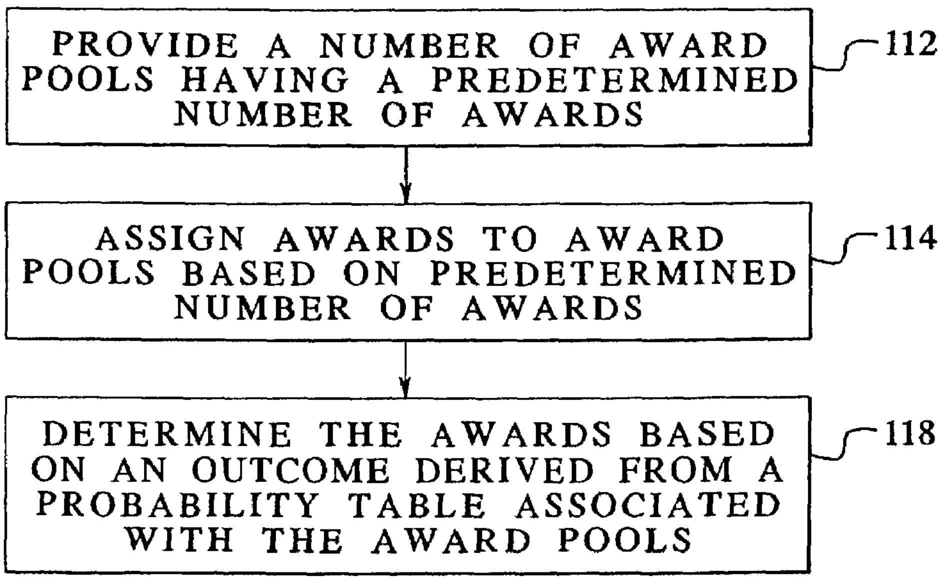
Figure 3C:
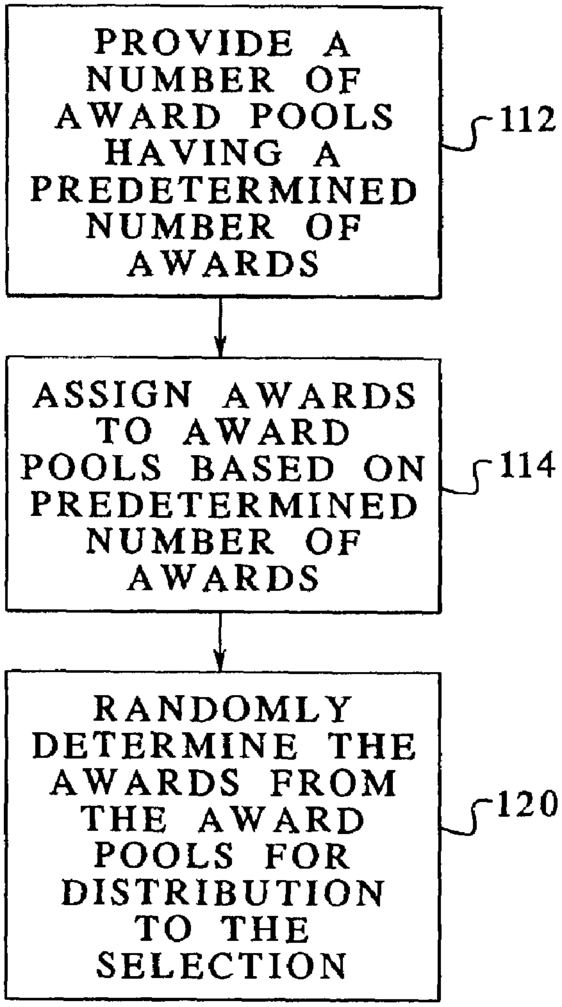

As shown in FIG. 3A, the game determines the awards from the award pools for distribution to the player selection as indicated by block 116. As shown in FIG. 3B, the determination step is preferably based on an outcome derived from a probability table associated with each award pool as indicated by block 118.

Figure 3D:
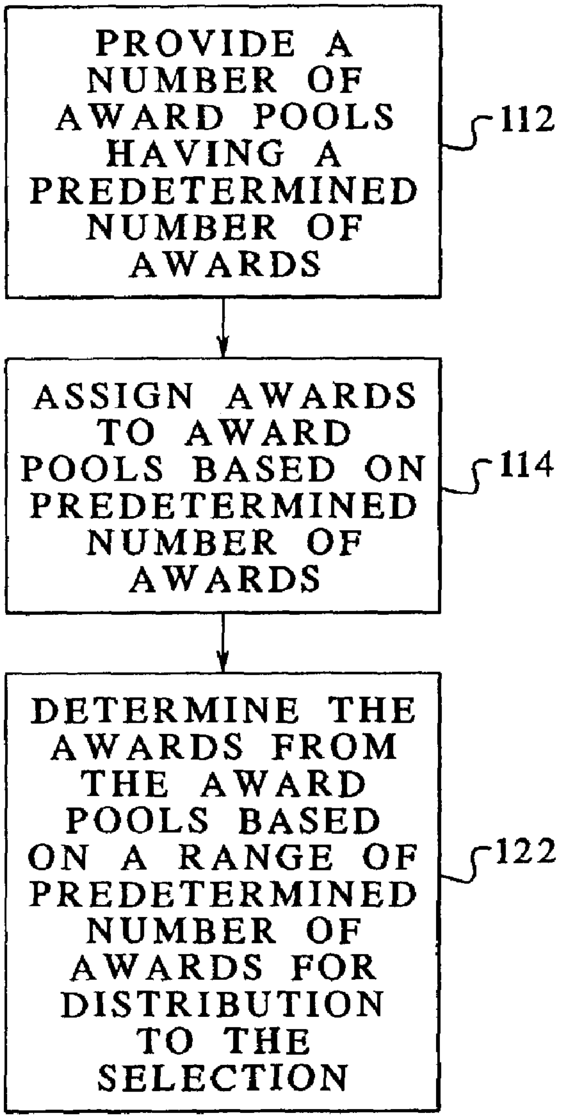

However, the present invention is not limited to this determination step and can include a variety of other determination steps. For example, the game can randomly determine the awards from the award pools for distribution to the player selection as indicated by block 120 and illustrated in FIG. 3C. As shown in FIG. 3D, the game determines the awards from the award pools based on a range of the predetermined number of awards associated with the award pools for distribution to the player selection as indicated by block 122.

Figure 4:
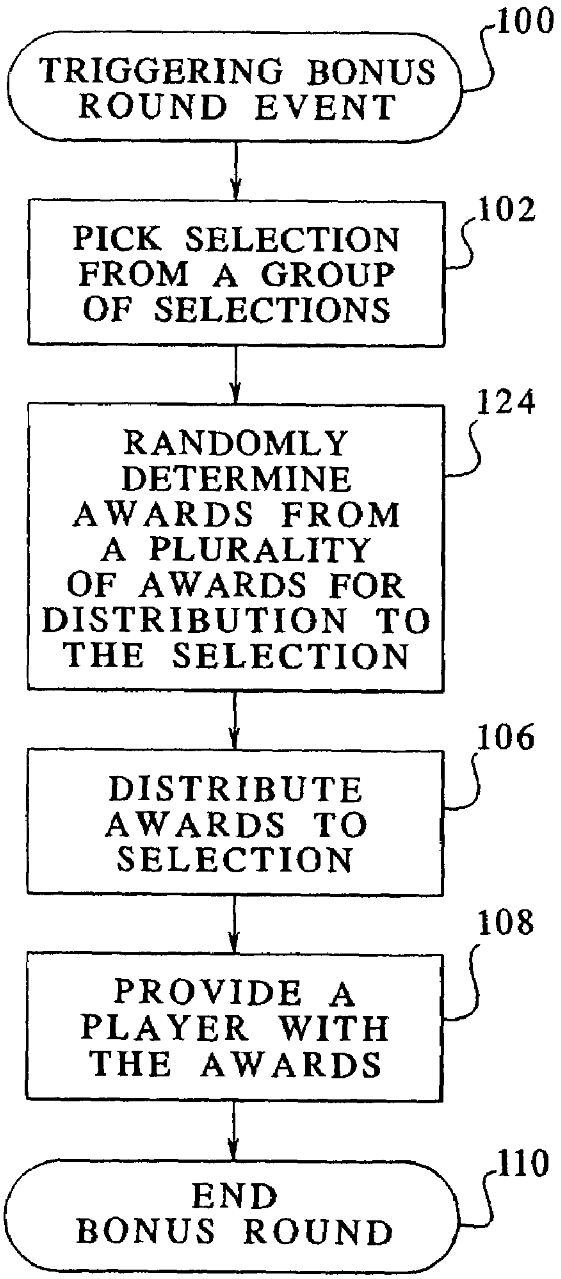
FIGS. 4 to 7 are flow diagrams of alternative embodiments of the present invention.
Figure 5:
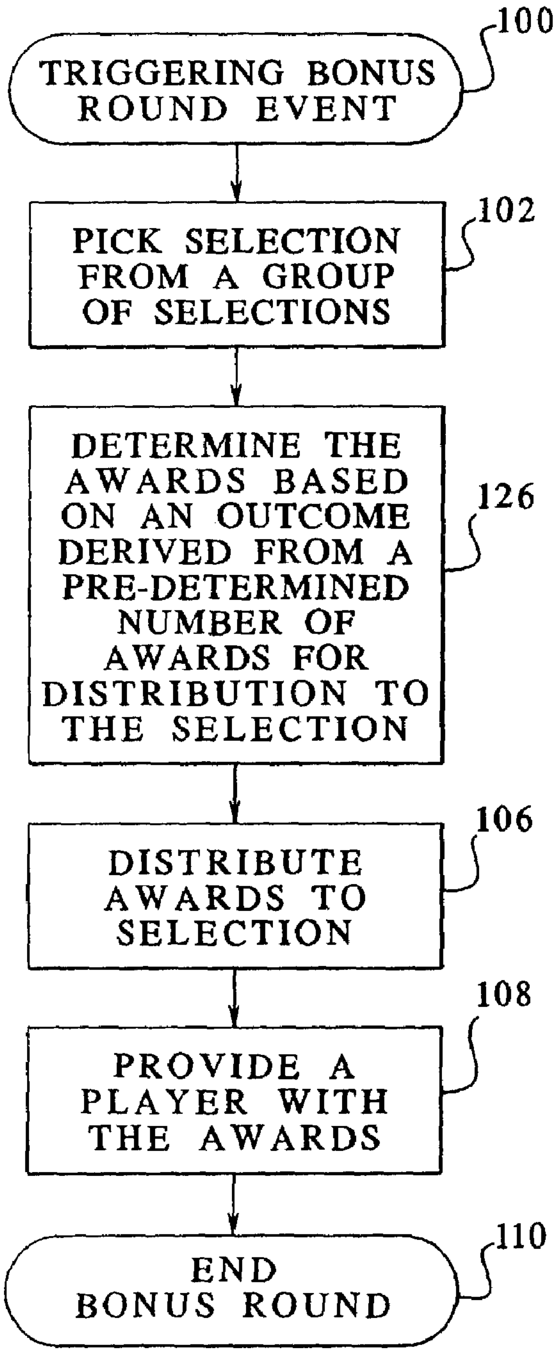

The present invention is not limited to utilizing the award pools for determining the awards for distribution to the player selection. For example, the game can randomly determine awards from a plurality of awards for distribution to the player selection as indicated by block 124 and illustrated in FIG. 4. As shown in FIG. 5, the game can determine the awards from a plurality of awards for distribution based on an outcome derived from a predetermined number of awards associated with the plurality of awards as indicated by block 126.

Figure 6:
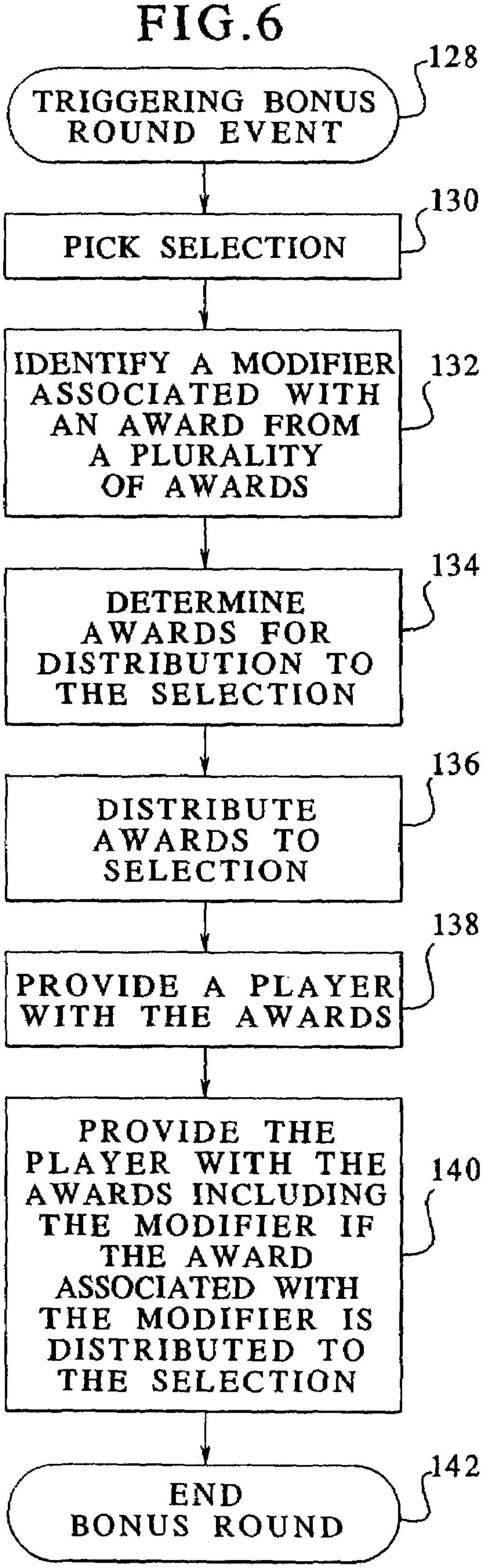

In order to create more excitement and entertainment for the player, the bonus scheme can include a variety of sequencing of events. For example, the triggering of a bonus round event and the picking of the player selection occur as indicated by circle 128 and box 130 of FIG. 6. The game identifies a modifier associated with an award from a plurality of awards as indicated by block 132. The game determines the awards for distribution to the player selection as indicated by block 134. The awards are distributed to the player selection and a player award is provided with the awards as indicated by blocks 136 and 138. The game provides the player with the awards including the modifier if the awards distributed to the selection include the modifier as further indicated by block 140. However, the present invention is not limited to this particular sequence for providing awards including the modifier, and thus, the game can provide awards including the modifier based on a variety of suitable sequences. Thereafter, the bonus round ends as indicated by block 142.

Figure 7:
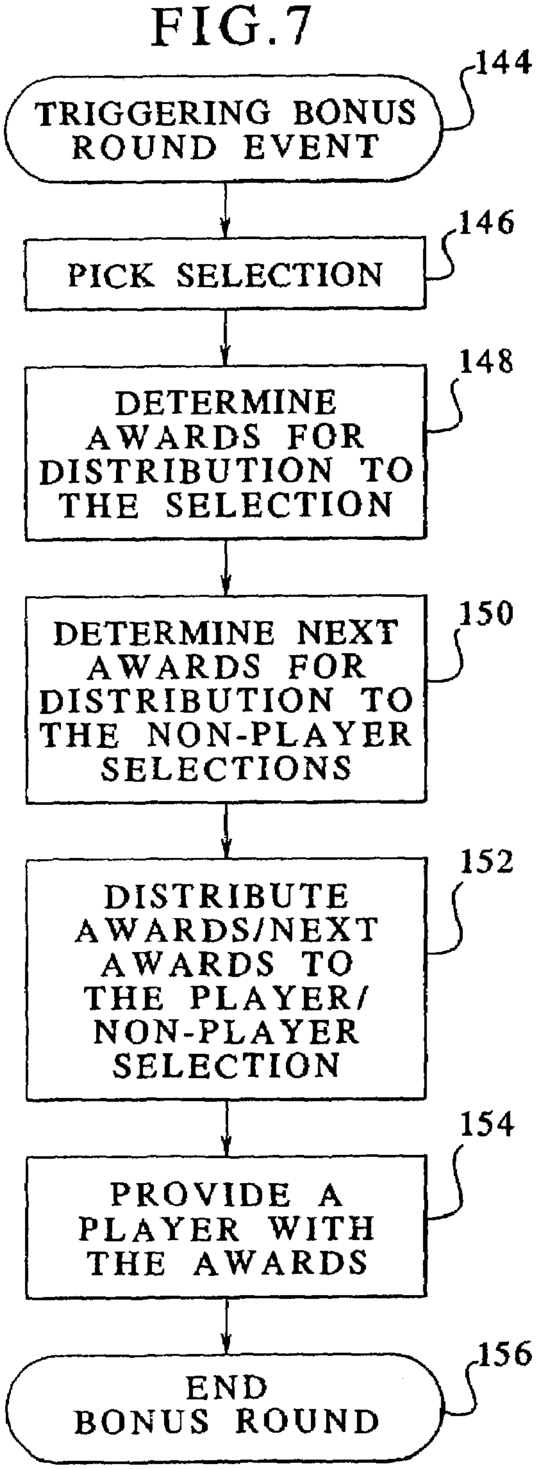

In an alternative embodiment as shown in FIG. 7, the bonus round begins with a triggering event as indicated by circle 144. The player preferably picks or chooses a player selection from a group of selections (i.e., a selection group)

as indicated by block 146. The game determines the awards from a plurality of awards for distribution to the player selection as indicated by block 148. The game continues by determining the next awards from the plurality of awards for distribution to a plurality of the non-player selections (i.e., the selections other than the player selection) from the selection group as indicated by block 150. The awards are distributed to the player and non-player selections as further indicated by block 152. The game provides a player with the awards distributed to the player selection as indicated by block 154. Thereafter, the bonus round ends as indicated by circle 156.

It should be appreciated that the present invention is not limited to a specific configuration. The components of the bonus scheme, such as the selections (i.e., player and non-player selections), awards, award pools and probability tables, can include a variety of different configurations and constructions.

Figure 8:
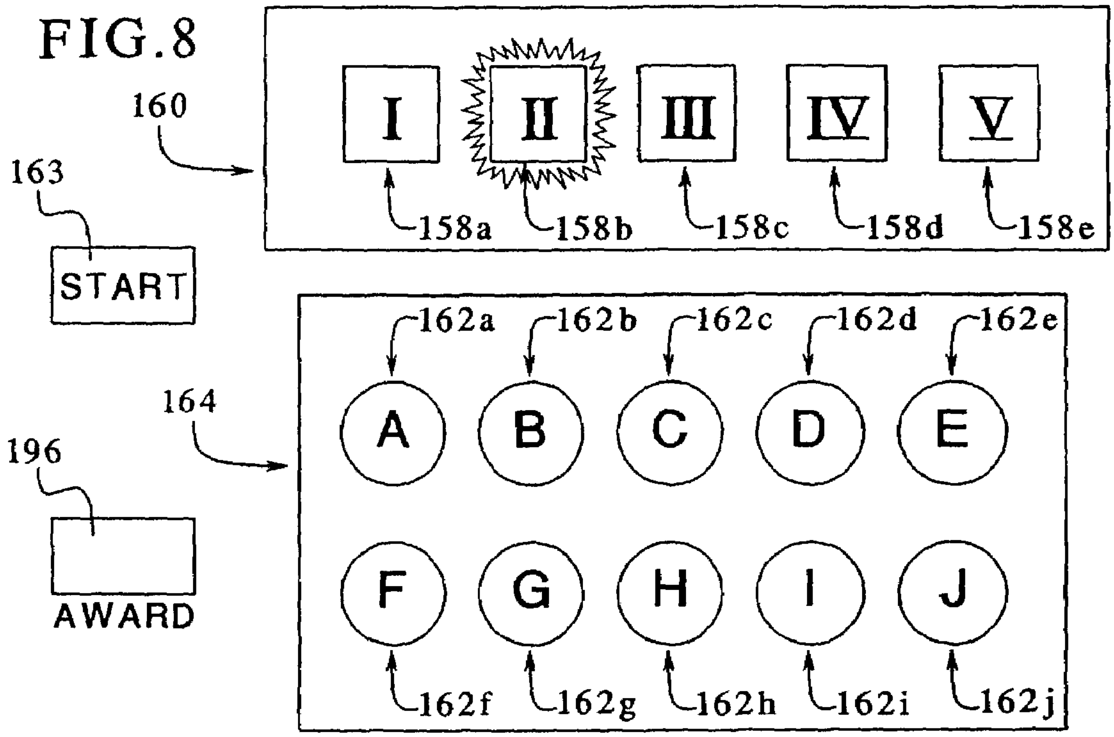
FIG. 8 is a top plan view of an embodiment of the bonus scheme illustrating the player selection.

In one preferred embodiment, the bonus round includes a number of selections 158*a* to 158*e* (collectively referred to as 158) in a group of selections (i.e., selection group) 160 and a number of awards 162*a* to 162*j* (collectively referred to as 162) in a group of awards (i.e., an award group) 164 as illustrated in FIG. 8. The selection group 160 preferably includes five selections 158 labeled "I" to "V" for illustrative purposes. The selections can include a variety of different configurations. For example, the selections preferably include symbols that represent a number of individuals who are beneficiaries to a will. However, the symbols associated with the selections can include a variety of different symbols, such as number symbols, letter symbols, graphical representations or other like symbols.

The awards 162 in the award group 164 are preferably masked or not revealed. However, the awards can be revealed or unmasked at any suitable time and in any suitable configuration during the game. One embodiment of the present invention includes ten awards 162 associated with an award symbol labeled as "A" to "J" for illustrative purposes. The award symbols associated with the awards 162 include a number of graphical representations illustrating various types of property for distribution to a number of beneficiaries of a will. However, the award symbols associated with the awards 162 can include a variety of different symbols, such as number, letter, graphical and other like symbols.

It should be appreciated that the present invention is not limited to the number, type, or configuration of the selections and awards (i.e., the number of selections and awards is not limited to five and ten, respectively).

The player (not shown) is associated with one of the selections 158 (i.e., the beneficiaries) by picking or choosing one of the selections 158 after the bonus round begins, for example when the player depresses the start button 163. As shown in FIG. 8, the game distinguishes the player selection 158*b* (i.e., the selection picked by the player) by highlighting it in a color (not shown) that is different than the other selections or non-player selections, namely, 158*a*, 158*c*, 158*d* and 158*e*, or by identifying it in some other known audio, visual or other like way.

Figure 9:
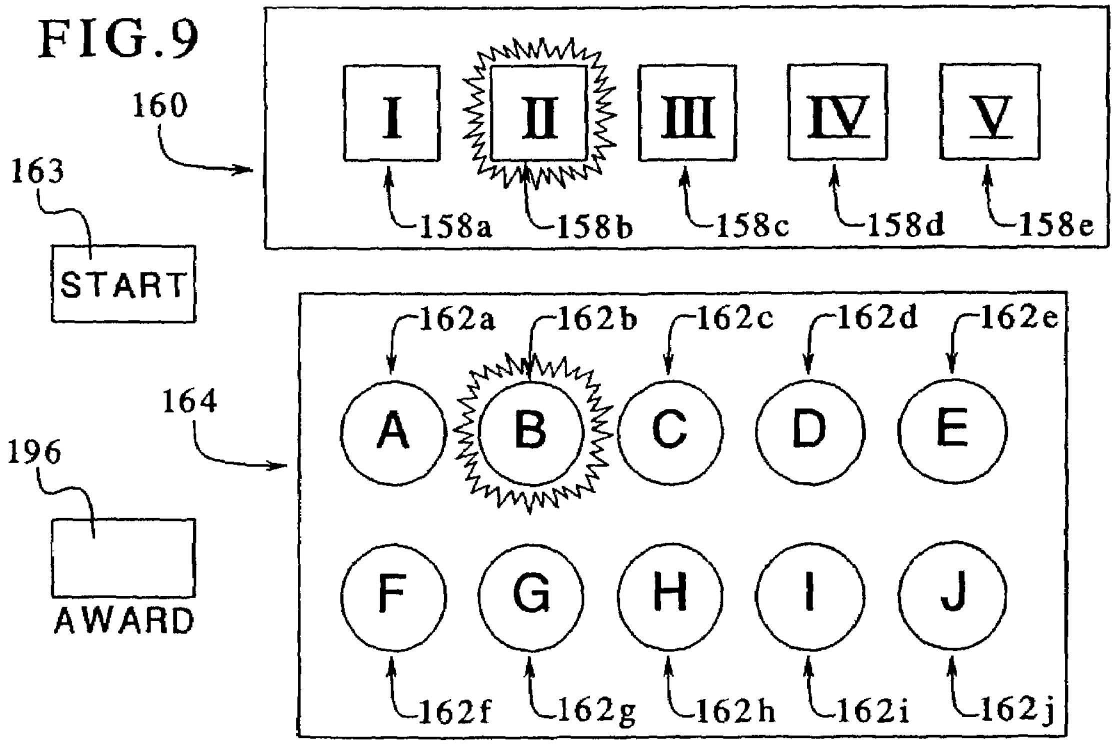
FIG. 9 is a top plan view of the bonus scheme of FIG. 8 illustrating the identification of a modifier associated with an award in a group of awards.

The game identifies an award 162*b* in the award group 164 as illustrated in FIG. 9. The identified award 162*b* is associated with a modifier (not shown) which enables the player to have an increased award if a certain event occurs as described in detail below. The modifier is preferably masked or not revealed. However, the modifier can be unmasked or revealed at any suitable time during the game and in any suitable manner. The identified award 162*b* is preferably designated by an audio mechanism. However, the identified award 162*b* can be designated in other like audio and/or visual ways in order to enhance player excitement and entertainment.

Figure 10:
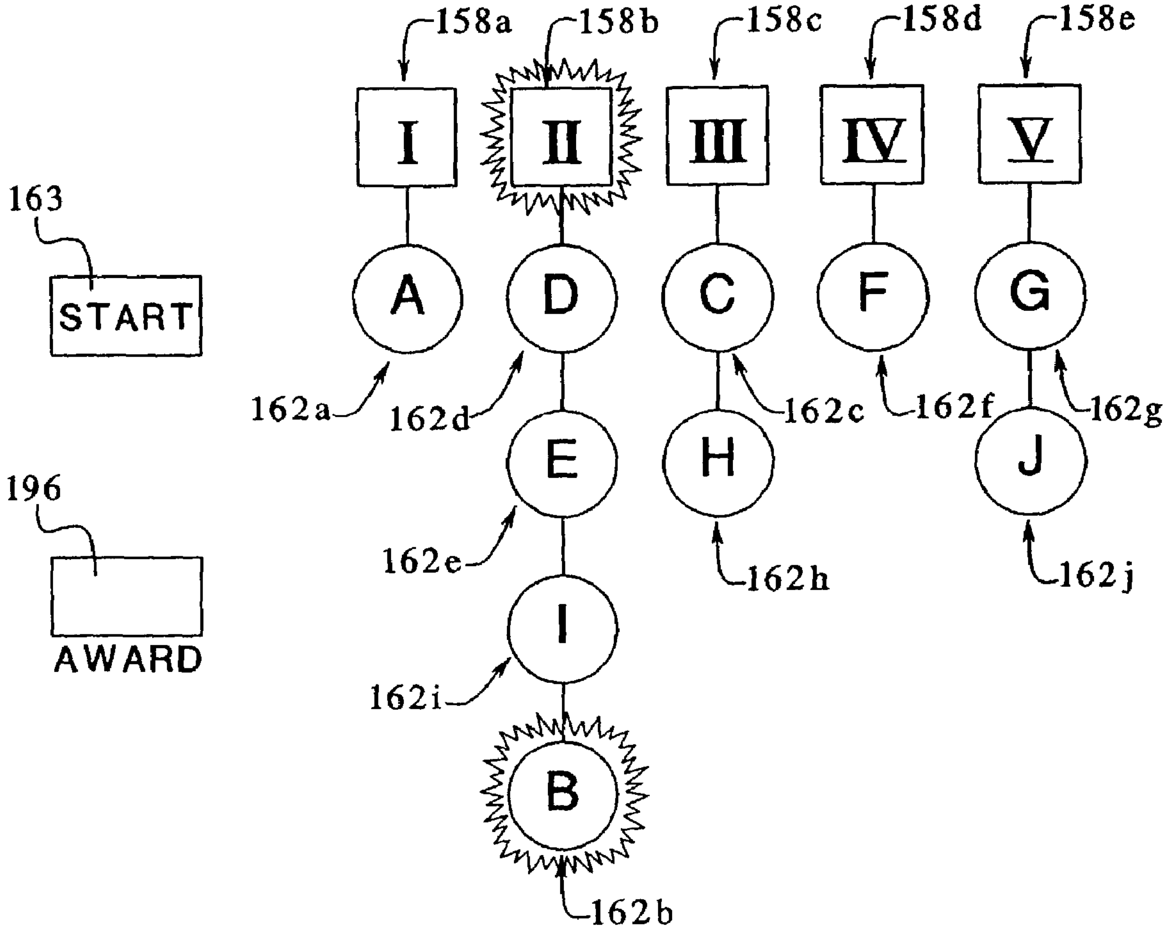
FIG. 10 is a top plan view of the bonus scheme of FIG. 8 illustrating the distribution of awards to player and non-player selections.

As discussed above, the game determines how the awards 162 (i.e., the property of the will) are distributed to the selections 158 (i.e., the beneficiaries of the will). Once determined, the game distributes the awards 162 to the selections 158 as illustrated in FIG. 10 and described in detail below. Prior to distributing the awards 162, the game preferably determines the awards 162 for distribution to the player selection 158*b* by utilizing a number of award pools as shown in FIG. 10A.

For example, the award pools preferably include a first, second and third award pool as illustrated by blocks 166, 168 and 170, respectively. Each of the award pools includes a predetermined number of awards for distribution to the player selection as indicated by blocks 172, 172*a*, 172*b* and 172*c*. The awards 162 in the award group 164 are assigned to the award pools based on the number of predetermined awards as indicated by blocks 174, 174*a*, 174*b* and 174*c*.

As indicated by blocks 176, 176*a*, 176*b* and 176*c*, the award pools include a number range of awards for distribution, that is, the minimum and maximum number of awards to be distributed from the award pools. For example, the first award pool has a range of "2" to "4" as indicated by block 176*a*, that is, the minimum number of awards for distribution is two and the maximum number of awards for distribution from this award pool is four.

The award pools also include a range of awards associated with each of the award pools as indicated by blocks 178, 178*a*, 178*b* and 178*c*. For example, the award range by block 178*a* associated with the first award pool ranges from "2" to "10". The awards represent a nominal award value associated with the awards of each of the award pools, that is, the minimum award from the first award pool is two and the maximum award from the first award pool is ten.

As further illustrated in FIG. 10A, the award pools determine the number of awards for distribution to the player selection as indicated by blocks 180, 180*a*, 180*b* and 180*c*. The first award pool includes two awards associated with symbols labeled "D" and "E" as indicated by block 180*a*. The award pools include an award associated with the distributed awards as shown by blocks 182, 182*a*, 182*b* and 182*c*. The award associated with the first award pool is "4" as indicated by block 182*a*, that is, the cumulative or total of values associated the awards labeled "D" and "E". The second award pool includes one award associated with a symbol labeled "I" having an award totaling "20" as indicated by blocks 180*b* and 182*b*. The third award pool includes one award for distribution, namely, the award labeled "B" having an award of "30" as indicated by blocks 180*c* and 182*c*.

It should be appreciated that the award pools of FIG. 10A are configured for illustrative purposes. The award pools can be configured in a variety of different ways. For example, the award pools can include any number of award pools containing a variety of different predetermined number of awards, range of awards, the number range of awards and other like award pool conditions or parameters.

The number of awards determined for distribution to the player selection is preferably based on an outcome derived from a probability table associated with the award pools as illustrated in FIGS. 10B to 10D. Alternatively, this number of awards can be randomly determined.

As shown in FIGS. 10B to 10D, the probability tables associated with each of the award pools includes a distribution probability associated with the possible number of awards for distribution. The number of awards for distribution and its respective distribution probability are indicated by blocks 184 to 184*c* and 186 to 186*c* for the first award pool as shown in FIG. 10B, by blocks 188 to 188*d* and 190 to 190*d* for the second award pool as shown in FIG. 10C and by blocks 192 to 192*c* and 194 to 194*c* for the third award pool as shown in FIG. 10D.

In particular, the first award pool includes a distribution probability of 40% for two awards as indicated by blocks 184*a* and 186*a*, that is, there is a 40% chance that the first award pool will include two awards for distribution as shown in FIG. 10B. Likewise, the first award pool includes a 30% chance of having three and four awards for distribution as indicated by blocks 184*b*, 184*c*, 186*b* and 186*c*.

Turning to FIG. 10C, the second award pool has a 20% distribution chance for one award as indicated by blocks 188*a* and 190*a*, a 50% distribution chance for two awards as indicated by blocks 188*b* and 190*b*, a 20% chance for three awards as indicated by blocks 188*c* and 190*c*, and a 10% chance for four awards as indicated by blocks 188*d* and 190*d*. As shown in FIG. 10D, the third award pool includes a 50% chance for distributing zero awards as indicated by blocks 192*a* and 194*a*, a 25% chance for distributing one award as indicated by blocks 192*b* and 194*b* and a 25% chance for distributing two awards as indicated by blocks 192*c* and 194*c*.

Referring to FIGS. 10 to 10D, the probability that the awards associated with the symbols labeled "D", "E", "I" and "B" would be distributed to the player selection 158*b* is 0.02 or 2%., that is, the probability of distributing two awards associated with the first award pool (i.e. 40% as indicated by block 186*a* as shown in FIG. 10B) multiplied by the probability of distributing one award associated with the second award pool (i.e., 20% as indicated by block 190*a* as shown in FIG. 10C) multiplied by the probability of distributing one award associated with the third award pool (i.e., 25% as indicated by block 194*b* as shown in FIG. 10D).

Once the game determines the awards 162 for distribution, the awards 162 are distributed to the player selection 158*b*. As shown in FIG. 10, the player selection 158*b* associated with the symbol labeled "II" includes four awards distributed thereto, namely, the awards associated with the symbols labeled "D", "E", "I", and "B", based on the award pool determinations as previously discussed. The remaining awards, namely, the awards associated with the symbols labeled "A", "C", "H", "F", "G", and "J", are distributed to the non-player selections, namely, 158*a*, 158*c*, 158*d* and 158*e*. The awards 162 are randomly distributed to the player selection 158*b* and the non-player selections 158*a*, 158*c*, 158*d* and 158*e*, that is, the awards 162 are generally distributed in any order (i.e., randomly) in order to create excitement for the player. However, the award 162*b* associated with the modifier is preferably distributed last in the sequence of award distributions in order to enhance the excitement of the game.

As shown in FIG. 10, the award 162*b* associated with the symbol labeled "B" includes the modifier and is distributed to the player selection 158*b*. Therefore, the player's award associated with the award of the player selection 158*b* of "54" (not shown), that is, the cumulative total of the awards associated with the first, second and third award pools as previously discussed and further illustrated in FIG. 10A, is preferably increased by a multiplier factor associated with the modifier. The multiplier factor is preferably two. Therefore, the player's award is "108" as indicated in the bonus value award display 196. It should be appreciated that the modifier can include any suitable number of multiplier factors. The modifier can also include a variety of other modifiers. For example, the modifier can include the sum total of all of the awards 162.

It should be appreciated that the player's award is not limited to an award associated with a bonus value, that is an award that is added to the player's award total associated with regular game play (i.e., game play other than game play during the bonus round). For example, the player's award can include an award associated with a credit value that provides, for example, extended game play or an award associated with any other suitable game value.

While the present invention has been described in connection with what is presently considered to be the most practical and preferred embodiments, it is to be understood that the invention is not limited to the disclosed embodiment, but on the contrary is intended to cover various modifications and equivalent arrangements included within the spirit and scope of the claim. It is thus to be understood that modifications and variations in the present invention may be made without departing from the novel aspects of this invention as defined in the claims and that this application is to be limited only by the scope of the claims.

The invention is claimed as follows:

1. A method for operating a gaming device having a game operable upon a wager by a player, the method comprising:

(a) simultaneously displaying to the player a plurality of player-selectable selections and a plurality of awards independent of the selections, wherein the awards are not associated with the selections;

(b) enabling the player to pick at least one of the selections;

(c) after the player picks at least one of the selections, for each of the awards, randomly determining and displaying an exclusive association of said award with one of the selections, wherein more than one of the awards can be associated with at least one of the selections and wherein the association of each of the plurality of awards with one of the selections is independent of any other association of awards with the selections; and providing the player with each award associated with each of the selections picked by the player.

2. The method of claim 1, wherein associating the awards with the selections includes determining the awards from a plurality of award pools.

3. The method of claim 2, which includes, prior to determining the awards, funding the award pools from a probability table that associates each of different award amounts with a likelihood of being generated.

4. The method of claim 2, which includes, prior to determining the awards, funding the award pools from a probability table for each award pool.

5. The method of claim 4, wherein at least two probability tables include different entries corresponding to different amounts of awards to be assigned to one of the selections.

6. The method of claim 1, wherein values of the displayed awards are masked before determining the association of the awards with the selections.

7. The method of claim 1, wherein providing the award to the player includes revealing a value associated with each of the awards associated with the selection picked by the player.

8. The method of claim 1, wherein the award provided to the player is based on at least one award associated with the selection picked by the player.

9. The method of claim 8, wherein the award is based on a plurality of award values, each value associated with one of the awards.

10. The method of claim 1, which includes enabling the player to pick more than one of the selections, and, after the player picks said selections, randomly determining and displaying an association of the plurality of awards with one of the selections, and providing the player with each award associated with each selection picked by the player.

11. The method of claim 1, which includes modifying the award if a modifier is associated with the selection picked by the player.

12. The method of claim 1, which includes enabling the player to pick at least one of the awards and modifying the award provided to the player if the award picked by the player is associated with the selection picked by the player.

13. The method of claim 1, which is provided via a data network or a computer storage device.

14. The method of claim 13, wherein the data network includes an internet.

15. A method for operating a gaming device having a game operable upon a wager by a player, said method comprising:

(a) simultaneously displaying a plurality of selections and a plurality of awards to the player independent of the selections wherein the awards are not associated with the selections;

(b) displaying for each of the awards an exclusive visual association of said award with one of the selections, wherein more than one of the awards can be associated with at least one of the selections and wherein the association of each of the plurality of awards with one of the selections is independent of any other association of awards with the selections;

(c) providing for each of the awards an exclusive audible association of said award with one of the selections; and (d) providing the player with an award based on at least one award associated with one of the selections that is designated for the player before the display of the association of the awards with the selections.

16. The method of claim 15, which includes enabling the player to pick the designated selection.

17. The method of claim 15, which includes the step of revealing the award associated with the designated selection.

18. The method of claim 15, wherein the award is based on a plurality of awards associated with the designated selection.

19. The method of claim 15, wherein steps (a) to (d) are provided via a data network or a computer storage device.

20. The method of claim 19, wherein the data network includes an internet.

21. A method of operating a gaming device, said method comprising:

(a) simultaneously displaying a plurality of player selections and a plurality of award symbols independent of the selections, wherein the award symbols are not associated with the selections;

(b) for each award symbol, sequentially and individually associating visually said award symbol exclusively with one of the selections, wherein more than one of the awards can be associated with at least one of the selections and wherein the association of each of the plurality of awards with one of the selections is independent of any other association of awards with the selections; and (c) providing a player with an award based on at least one award symbol associated with one of the selections that is designated for the player before the association of the award symbol with the selections.

22. The method of claim 21, which includes enabling the player to pick the designated selection.

23. The method of claim 21, which includes the step of revealing the award symbols associated with the designated selection.

24. The method of claim 21, wherein the award is based on a plurality of award symbols associated with the designated selection.

25. The method of claim 21, wherein steps (a) to (c) are provided via a data network or a computer storage device.

26. The method of claim 25, wherein the data network includes an internet.

27. A method of operating a gaming device having a game operable upon a wager, the method comprising:

(a) maintaining a plurality of different ranges, each range having a plurality of numbers of awards;

(b) maintaining a plurality of different award pools, each associated with one of said ranges of numbers of awards;

(c) for each of a plurality of selections, associating one of the ranges of numbers of awards from any one of said plurality of different ranges with said selection;

(d) for each selection, randomly picking a number of awards to be associated with said selection from the range of numbers of awards associated with said selection based on probabilities associated with each said range of numbers of awards;

(e) displaying to a player said plurality of selections;

(f) distributing to each selection at least one award from any one of the award pools based on the number of awards associated with the selection in step (d), wherein said award pool is the award pool associated with at least one of the ranges of numbers of awards from which said number of awards associated with the selection in step (d) is picked; and (g) providing to the player said awards associated with at least one of the selections that is designated for the player before the association of the awards with the selections.

28. The method of claim 27, wherein each award pool includes a plurality of different awards.

29. The method of claim 27, wherein steps (a) to (g) are provided via a data network or a computer storage device.

30. The method of claim 29, wherein the data network includes an internet.

31. A method for operating a gaming device having a game operable upon a wager by a player, said method comprising:

(a) displaying a plurality of selections and a plurality of pools of awards for distribution to said selections;

(b) causing at least one selection from the group of selections to be picked;

(c) indicating each picked displayed selection;

(d) determining for each picked selection after said selection is picked at least one award from each of said plurality of pools of awards for distribution to said selection;

(e) distributing said awards to each of said selections; and (f) displaying and providing to the player the awards associated with each picked selection.

32. The method of claim 31, wherein step (d) includes determining the awards for distributing to the selections based on an outcome derived from a probability table associated with the award pools.

33. The method of claim 31, wherein step (d) includes randomly determining the awards for distributing to the selections from the plurality of award pools.

34. The method of claim 31, wherein step (d) includes determining the awards for distributing to the selections from a predetermined number of awards associated with the award pools.

35. The method of claim 34, wherein step (d) includes determining the awards for distributing to the selections from a range of the predetermined number of awards associated with the award pools.

36. A method for operating a gaming device having a game operable upon a wager by a player, said method comprising:

(a) displaying a plurality of selections and a plurality of award pools independent of the selections wherein the award pools are not associated with the selections;

(b) causing at least one selection from the plurality of selections to be picked;

(c) indicating each picked displayed selection;

(d) determining for each picked selection at least one award from any one of the plurality of award pools for distribution to said selection, wherein determining the awards for distribution to each picked selection includes (i) randomly determining a number of awards from each of the award pools to be associated with said selection, and (ii) randomly selecting the determined number of awards from each said award pool;

(e) distributing the determined awards to the picked selections; and (f) displaying and providing to the player the awards distributed to each picked selection.

37. The method of claim 36, wherein step (d) includes determining the number of awards to be associated with the selections from each of the award pools based on an outcome derived from a probability table associated with the award pools.

38. The method of claim 36, wherein step (d) includes determining the number of awards to be associated with the selections from each of the award pools based on a range of numbers associated with each award pool.

39. The method of claim 36, wherein step (d) includes randomly selecting the awards to be associated with the selections from each of the award pools from an award range associated with each award pool.

40. The method of claim 39, wherein step (d) includes determining the number of awards to be associated with the selections from each award pool based on a range of numbers associated with each award pool.

41. A method of determining awards for distribution to a selection in a game operable upon a wager by a player in a gaming device, the method comprising:

(a) assigning a plurality of awards from an award group to a plurality of different award pools based on a predetermined number of awards associated with each award pool;

(b) associating with each of said plurality of award pools a plurality of numbers of awards to be distributed from each award pool;

(c) determining the number of awards from each award pool to be distributed to each of a plurality of selections from said plurality of numbers of awards associated with said award pool;

(d) determining for each selection at least one award from any one of the award pools to be distributed to said selection based on the determined number of awards from each award pool;

(e) distributing said awards to each of the selections; and (f) providing to the player said awards associated with at least one of the selections that is designated for the player.

42. The method of claim 41, which includes displaying the plurality of selections and the plurality of awards from the award group to the player.

43. The method of claim 41, wherein determining the number of awards to be distributed to each of a plurality of selections is random.

44. The method of claim 41, wherein determining the number of awards to be distributed to each of a plurality of selections is based on probabilities associated with each said plurality of numbers of awards.

45. The method of claim 44, wherein the number of awards determined for distribution to the selections is based on an outcome derived from at least one probability table associated with the award pools.

46. The method of claim 41, which includes enabling the player to pick the selection that is designated for the player.

47. The method of claim 41, which includes associating a modifier with at least one of the awards in the award group, wherein the award provided to the player is modified if the modifier is associated with at least one of said awards distributed to at least one of the selections that is designated for the player.

* * * * *